United States Patent
Bose Rantham Prabhakara et al.

(10) Patent No.: US 8,166,049 B2
(45) Date of Patent: Apr. 24, 2012

(54) TECHNIQUES FOR COMPUTING SIMILARITY MEASUREMENTS BETWEEN SEGMENTS REPRESENTATIVE OF DOCUMENTS

(75) Inventors: Jagadeesh Chandra Bose Rantham Prabhakara, Andhra Pradesh (IN); Ashwin Nayak, Bangalore (IN); Anitha Chandran, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 313 days.

(21) Appl. No.: 12/473,347

(22) Filed: May 28, 2009

(65) Prior Publication Data

US 2009/0300006 A1    Dec. 3, 2009

(30) Foreign Application Priority Data

May 29, 2008  (IN) .......................... 1303/CHE/2008

(51) Int. Cl.
*G06F 17/30* (2006.01)
(52) U.S. Cl. ..................... 707/748; 707/749; 707/750
(58) Field of Classification Search ........... 707/748–750
See application file for complete search history.

(56) References Cited

U.S. PATENT DOCUMENTS

| | | | | |
|---|---|---|---|---|
| 5,619,709 | A * | 4/1997 | Caid et al. ..................... | 715/209 |
| 6,418,431 | B1 * | 7/2002 | Mahajan et al. ................ | 1/1 |
| 6,847,966 | B1 * | 1/2005 | Sommer et al. ................ | 707/739 |
| 7,275,061 | B1 * | 9/2007 | Kon et al. ...................... | 1/1 |
| 7,383,269 | B2 | 6/2008 | Swaminathan | |
| 7,562,066 | B2 * | 7/2009 | Kawatani ....................... | 1/1 |
| 2004/0186828 | A1 * | 9/2004 | Yadav et al. .................... | 707/3 |
| 2006/0224584 | A1 | 10/2006 | Price | |
| 2007/0186210 | A1 * | 8/2007 | Hussain et al. ................ | 717/106 |

FOREIGN PATENT DOCUMENTS

| | | | |
|---|---|---|---|
| WO | WO0241557 | | 5/2002 |
| WO | WO2005041063 | * | 5/2005 |

OTHER PUBLICATIONS

Castells et al., "An Adaptation of the Vector-Space Model for Ontology-Based Information Retrieval," IEEE Transactions on Knowledge and Data Engineering, vol. 9, No. 2, Feb. 2007.*
G. Salton: "A document retrieval systems for man-machine interaction", Proceedings of the 1964 19th ACM National Conference, 1964, XP002540919, New York, NY USA.
European Search Report issued Oct. 29, 2009 for Application No. 09161391.9-2201.

* cited by examiner

*Primary Examiner* — Srirama Channavajjala
*Assistant Examiner* — Grace Park
(74) *Attorney, Agent, or Firm* — Vedder Price PC (57) ABSTRACT

Keyword frequency data for a plurality of document-derived segments is represented in a matrix form in which each segment is represented as a vector of dimensionality equal to the number of keywords. The matrix may be subdivided into a plurality of sub-matrices, each preferably corresponding to a non-overlapping portion of the plurality of keywords. When determining a similarity measurement between any pair of segments, at least a portion of the keyword frequency data for each sub-matrix's non-overlapping keywords are used to determine a sub-matrix dot product for the pair of segments. The resulting plurality of sub-matrix dot products are then summed together in order to provide the similarity measurement. Keywords that are synonyms of each other may be accommodated through the modification of keyword frequency data. Where the keyword frequency data in the matrix representation is relative sparse, compressed views of the matrix representation may be provided.

6 Claims, 5 Drawing Sheets

- PRIOR ART -

TECHNIQUES FOR COMPUTING SIMILARITY MEASUREMENTS BETWEEN SEGMENTS REPRESENTATIVE OF DOCUMENTS

FIELD OF THE INVENTION

The instant disclosure relates generally to repository navigation systems and, in particular, to techniques for computing similarity measurements between segments representative of documents within such repository navigation systems.

BACKGROUND OF THE INVENTION

Figure 1:
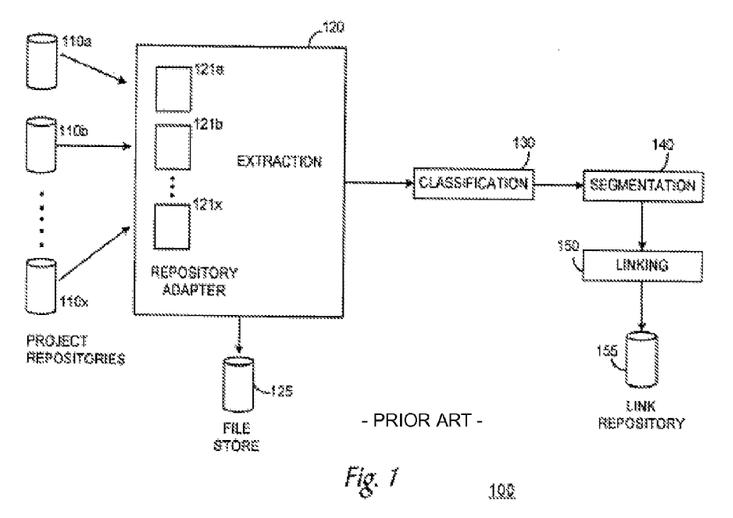
FIG. 1 is a block diagram of a prior art embodiment of a backend system for use with a repository navigation tool, and in which a linking component is provided for establishing relationships between segments representative of documents in a repository.

Repositories for documents are well known in the art. Within such repositories, literally thousands of documents of various types—text, spreadsheets, presentations, diagrams, ad hoc databases, programming code, etc.—maybe stored according to any desired hierarchy. Given the sheer quantity of documents within such repositories, it is desirable to provide systems and techniques for navigating within the repositories. For example, U.S. Pat. No. 7,383,269 in the name of Swaminathan et al. and entitled "Navigating A Software Project Repository" ("the '269 patent") describes a repository navigation tool comprising a backend system for processing documents in a repository and a front end system for accessing the processed documents. FIG. 1 illustrates the backend system of the repository navigation tool system described in the '269 patent. As shown, the backend system 100 extracts relevant files from the various project repositories 110 using repository adapters 121. The extracted files are treated by the extraction tool 120 as essentially uniform materials, that are subsequently stored in a file store 125.

As shown, the extraction tool 120 communicates with a classification tool 130, a segmentation tool 140, and a linking tool 150. The classification tool 130 operates to classify each document provided by the extraction tool 120 into one of a plurality of categories. In turn, the segmentation tool 140 divides the extracted and classified documents into one or more segments. As used herein, and as further described in the '269 patent, a segment of a document comprises a subset of information that is grouped in some distinguishable and well-delineated manner from surrounding information such that the segmentation tool 140 is able to discern an author's intent to communicate to a reader that the subset of information may be treated as a single, discrete piece of information. Further still, the linking tool 150, is operative to analyze the resulting segments for the existence of relationships between the various segments, and subsequently store information concerning the discovered relationships in a link repository 155. Based on the links established in this manner, the front end system illustrated and described in the '269 patent may be used to identify documents that are related to each other by virtue of similarity of their corresponding segments.

The '269 patent describes a particular technique for operation of the linking tool 150. In particular, the '269 patent describes characterization of each segment as an n-dimensional vector, where n represents the available "universe" of keywords extracted from the segments. For each segment, the vectors is populated by the frequency of each of the n different keywords within that segment. That is, magnitude of a segment's vector along a particular keyword dimension is equal to the frequency of that keyword in the segment. Using this representation, similarity of segments may be determined using so-called cosine similarity analysis, i.e., by determining the dot product between segment vectors. While the repository navigation tool described in the '269 patent has been a useful addition to the prior art, further refinements for determining segment similarity (i.e., for discovering relationships between segments) would represent an advancement in the art.

SUMMARY OF THE INVENTION

The instant disclosure describes techniques for determining the similarity of segments in a repository navigation tool. In particular, the techniques described herein provide a more efficient and robust basis for determining the similarity of segments represented as vectors of keyword frequency data. In an embodiment, the keyword frequency data for a plurality of segments is represented in a matrix form. For example, the plurality of segments may be represented as rows within the matrix, and the plurality of keywords may be represented by columns within the matrix. In this manner, each segment may be represented as a vector of dimensionality equal to the number of keywords. To enable more efficient processing of the keyword frequency data, the matrix may be subdivided into a plurality of sub-matrices, each preferably corresponding to a non-overlapping portion of the plurality of keywords. In order to determine a similarity measurement between any pair of segments, at least a portion of the keyword frequency data for each sub-matrix's non-overlapping keywords are used to determine a sub-matrix dot product for the pair of segments. The resulting plurality of sub-matrix dot products corresponding to the pair of segments are then summed together in order to provide the similarity measurement. In this manner, the instant disclosure describes a technique for distributing the calculation of such similarity measurements, thereby enabling distributed processing and, consequently, faster similarity determinations, particularly for segments spanning a relatively large number of keywords. Using the matrix representation, the addition of documents to the underlying repository may be quickly accommodated through the determination of keyword frequency data for the added document's identified segments and subsequent similarity determinations with the prior segments.

In another embodiment, keywords that are synonyms of each other may be accommodated through the modification of keyword frequency data. To this end, the keyword frequency data for a first keyword that is a synonym of a second keyword may be added (preferably across all segments represented in the matrix/sub-matrices) to the keyword frequency data for the second keyword. By summing the keyword frequency data for synonymous keywords, the similarity between segments that might otherwise have been hidden by circumstantial word choices is enhanced. Thereafter, the dot products used for determining similarity between segments may be based on the resulting modified keyword frequency data.

In those instances in which the keyword frequency data in the matrix representation is relative sparse (i.e., includes a relatively small percentage of non-zero entries), compressed views of the matrix representation may be provided. Such views eliminate the literal vector representation of each segment, but reduce the number of computations needed to determine the inter-segment dot products by reducing the stored keyword frequency data to only those non-zero entries that contribute to similarity measurements for a given segment.

Preferably, the techniques described herein are implemented by one or more suitably programmed processing devices.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 2:
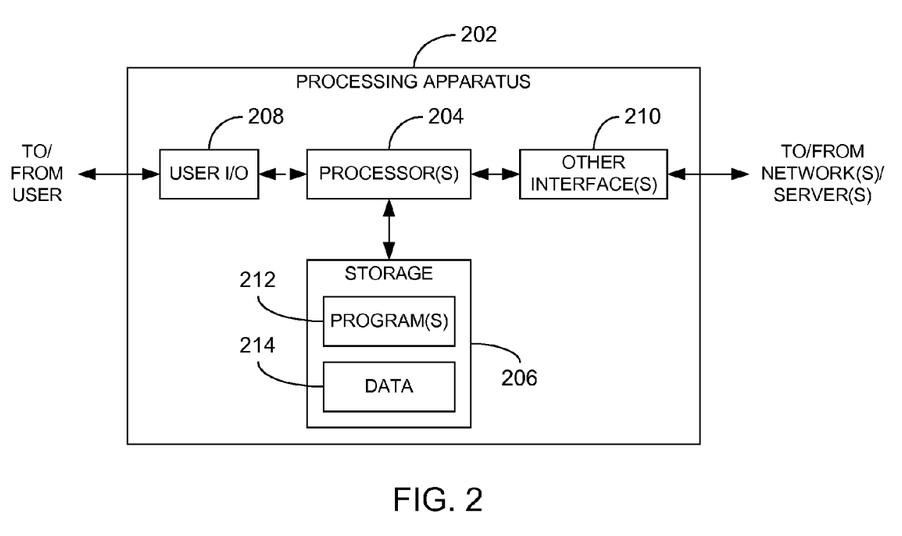
FIG. 2 is a block diagram of a processing apparatus that may be used to implement the various embodiments described herein.

Referring now to FIG. 2, a processing apparatus 202, suitable for implementing processing in accordance with the instant disclosure is further illustrated. In particular, the processing apparatus 202 may be used to implement the processing described herein as part of the linking tool 150. Further still, the processing apparatus may be used to implement additional components illustrated in FIG. 1, e.g., the classification tool 130 and/or segmentation tool 140, as a matter of design choice. As shown, the processing apparatus 202 comprises one or more processors 204 in communication with one or more storage devices 206. As known in the art, the processor(s) 204 may comprise a microprocessor, microcontroller, digital signal processor, co-processor or other similar devices known to those having ordinary skill in the art. In a similar vein, the storage devices 206 may comprise any suitable combination of volatile and/or nonvolatile memory such as random access memory (RAM) or read only memory (ROM), respectively. Such storage devices 206 may be embodied using any currently known media such as magnetic or optical storage media including removable media such as floppy disks, compact discs, etc. Regardless, the storage device(s) 206 has stored thereon instructions (i.e., software) 212 that may be executed by the one or more processors 204 such that the processor(s) 204 implement the functionality described herein. Furthermore, the storage device(s) 206 has stored thereon data 214, such as operational variables, data structures and the like used by the software 212 as it is executed. In one embodiment, the data 214 comprises a matrix representation of keyword frequency data corresponding to a plurality of segments, as described in further detail below. It is further noted that, as known in the art, some or all of the software-implemented functionality may be implemented using firmware and/or hardware devices such as application specific integrated circuits (ASICs), programmable logic arrays, state machines, etc.

As further shown, the one or more processors 204 may be in communication with various user input/output devices 208 that allow a user of the processing apparatus 202 to interact therewith. For example, the user input/output devices 208 may comprise one or more display screens, keyboards, user selection devices (e.g., a mouse and cursor combination, a touch screen, voice recognition interfaces, etc.), speakers, microphones, etc. The one or more processors 204 may also be in communication with other interfaces 210 that provide one or more communication interfaces between the processing apparatus 202 and external devices, such as a network, other processing devices, peripheral equipment, etc. The nature of the other interfaces 210 necessarily depends on the external devices with which the processing apparatus 202 communicates. For example, where the processing apparatus 202 is coupled to a network via a wired connection, the interfaces 210 may comprise the software, firmware and/or hardware necessary to terminate the relevant network protocols. Similarly, where the processing apparatus 202 communicates with a wireless network, the interfaces 210 may comprise the components needed to terminate the wireless protocol. Once again, those having skill in the art will appreciate that various implementations are possible, and that the present invention is not limited in this regard.

Figure 3:
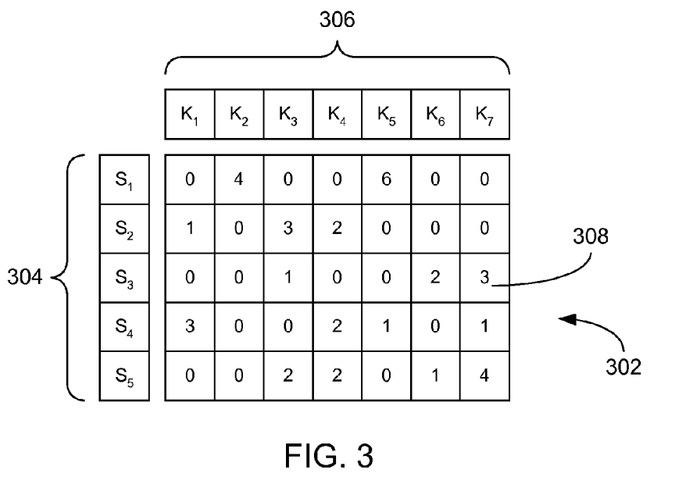
FIG. 3 is an illustration in which various document segments and corresponding keyword frequency data are illustrated using a matrix representation.

Referring now to FIG. 3, a matrix representation 302 of keyword frequency data is further illustrated. As those having ordinary skill in the art will appreciate, such matrix representations are readily implemented using a variety of data processing programs including, but not limited to, spreadsheet programs or relational database management systems (RDBMS). As described in the '269 patent, each segment of a given document may be processed by a term extractor 120 that identifies or "extracts" keywords from within the segment. It is noted that the keywords need not be the exact words as in the document, i.e., they can be processed variants of the keywords such as the root words. For example, all the words "retrieve", "retrieved", "retrieval", "retrieving", etc. would be mapped to the root word, "retriev". Based on this extracted keyword information, keyword frequency data 308 (i.e., the number of times each keyword appears is a segment, if at all) may be determined for each of the plurality of segments 304. In an embodiment, keywords may comprise individual words or phrases. Furthermore, the keyword extraction process may operate to exclude stop words that, as known in the art, include commonly occurring words (e.g., "the", "a", "and", etc.) that do not substantially add understanding to the significance of the segment. In alternative embodiments, the keyword frequency data 308, rather than being straight frequency data, may comprise variants thereof such as logarithms of the keyword frequency data, keyword frequency data normalized by the number of words in each segment, or inverse document frequency for each keyword, etc. The inverse document frequency of a keyword is defined as the ratio between the total numbers of segments containing the keyword. In the matrix it is possible to store a tf*idf value, i.e., the product of the frequency of a term (keyword) and its corresponding inverse document frequency (idf).

Regardless of the format of the keyword frequency data 308 employed, the matrix representation 302 provides a beneficial format for handling the keyword frequency data 308. As shown, each segment 304 is represented as a vector of the keyword frequency data corresponding to a plurality of keywords 306. In the illustrated embodiment, the segments 304 are represented by the rows of the matrix 302, whereas the keywords 306 are represented in the columns of the matrix 302. However, those having ordinary skill in the art will appreciate that this representation could be altered such that the segments 304 correspond to the columns of the matrix 302, and the keywords 306 may be represented by the rows of the matrix 302. As described in greater detail below, an advantage of the matrix representation 302 is that it allows for the creation of various sub-matrices thereby improving the efficiency with which similarity measurements may be determined. It is noted that FIG. 3 illustrates a total of only five segments, $S_1$-$S_5$, for illustrative purposes only. Those having ordinary skill in the art will appreciate that, in practice, it is quite possible that each matrix 302 will comprise thousands, if not millions, of entries for the segments 304.

The matrix representation 302 facilitates the addition of new documents to the document repository and the subsequent determination of the similarity of the segments resulting from such new documents to the other segments previously provided. For example, with reference to the example illustrated in FIG. 3, assume that a new document has been added to a repository with which the matrix 302 is associated. In this case, a new segment labeled $S_5$, as shown, is provided as a new row entry in the matrix 302. Furthermore, the keyword frequency data for the new segment $S_5$ may be added as described above. With the new row added, similarity measurements between the new segment and the previously provided segments (in this case, segments $S_1$-$S_4$) may be readily calculated.

The matrix representation 302 facilitates the computation of similarity measurements between the various segments. As noted above, so-called cosine similarity analysis, based on the computation of dot products between vectors, may be used. Equation 1 below illustrates the formulation of the dot product of two n-dimensional vectors $\vec{a}=[a_1, a_2, \ldots a_n]$ and $\vec{b}=[b_1, b_2, \ldots b_n]$.

$$\vec{a} \cdot \vec{b} = \sum_{i=1}^{n} a_i b_i = a_1 b_1 + a_2 b_2 + \ldots a_n b_n \quad \text{Eq. 1}$$

In geometric terms, the dot product may be expressed as:

$$\vec{a} \cdot \vec{b} = |a||b|\cos\theta \quad \text{Eq. 2}$$

where $\theta$ is the angle between the two vectors and $|a|$ is the length or norm of $\vec{a}$. Taking advantage of the fact that the cosine of two perpendicular unit vectors (i.e., two completely dissimilar vectors) is 0 and that the cosine of two identical unit vectors is 1, the cosine of $\theta$ provides a convenient, bounded expression for the similarity of two vectors, which may be expressed through combination of Equations 1 and 2 as:

$$\cos\theta = \frac{\sum_{j=1}^{n} a_j b_j}{|a||b|} \quad \text{Eq. 3}$$

Equation 3 illustrates the cosine similarity used between two segments represented according to their keyword frequency data, as described above.

Figure 4:
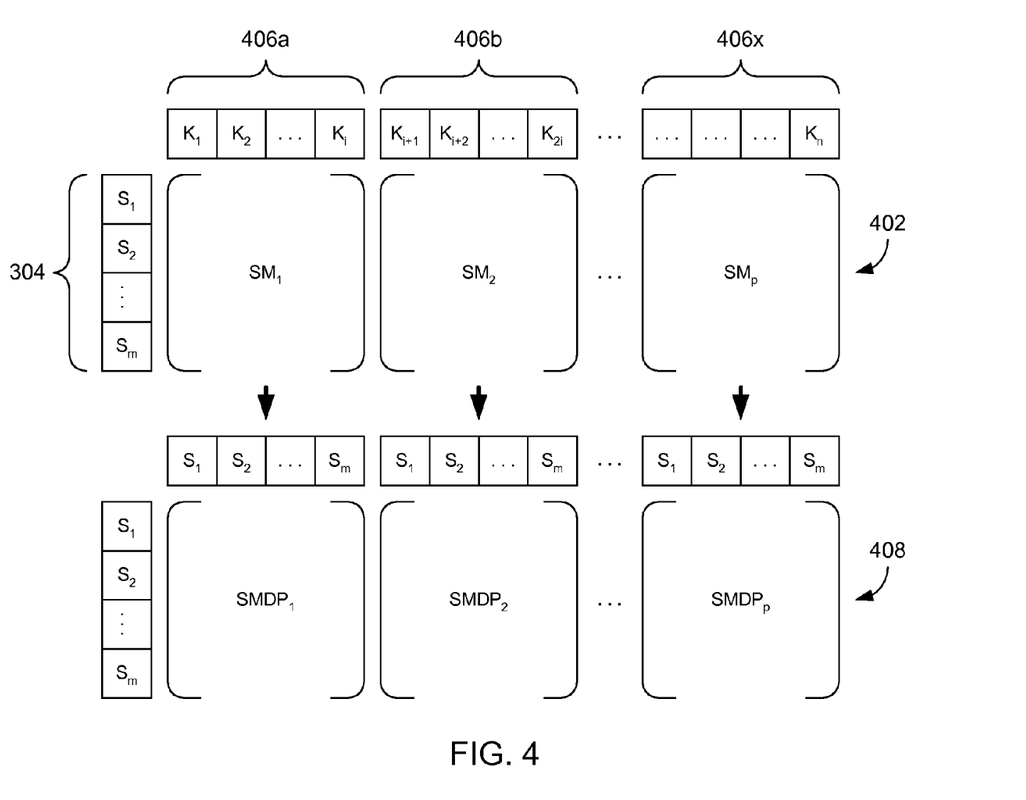
FIG. 4 is an illustration of the matrix representation of FIG. 3 decomposed into a plurality of sub-matrices, and further illustrating calculation of sub-matrix dot products in accordance with an embodiment described herein.

The matrix representation 302 permits a further representation of the segments according to a plurality of sub-matrices. This is further illustrated with regard to FIG. 4. As shown in FIG. 4, the matrix representation 302 may be subdivided into a plurality of sub-matrices 402. In particular, each sub-matrix 402 corresponds to a portion 406 of the plurality of keywords for each of the segments 304. More particularly, each portion of the keywords 406 comprises a non-overlapping portion of the keywords. For example, the matrix 302 is divided into p different sub-matrices 402, each spanning a unique portion, i, of the keywords 306 up to the total number of keywords, n.

Given this representation, the similarity metric described in Equation 3 may then be written:

$$\cos\theta = \frac{\sum_{j=1}^{n} a_j b_j}{|a||b|} = \frac{1}{|a||b|}\sum_{x=0}^{y-1}\sum_{z=xi+1}^{(x+1)i} a_z b_z \quad \text{Eq. 4}$$

where $n-1 < yi \leq n$ or, stated alternatively, the total number of keywords, n, can be divided into no more than $y-1$ sub-matrices each spanning a non-overlapping portion of i keywords, and a final sub-matrix spanning a non-overlapping portion of up to i keywords. Thus, the similarity measurement for a given pair of segments may be expressed as the appropriately normalized summation of the corresponding sub-matrix dot products for the two vectors. Referring again to the example illustrated in FIG. 4, the sub-matrix dot products 408 can be calculated based on the corresponding sub-matrices 402. Note that the sub-matrix dot products 408 are indexed along each dimension by the number of possible segments, m, reflecting the fact that similarity measurements may be determined for each pair of segments.

The use of sub-matrices 402 and the resulting addition of sub-matrix dot products 408 permits for a highly parallel implementation, particularly where the matrix representation 302 becomes quite large. That is, the matrix representation 302 may be split in the sub-matrices 402, where each sub-matrix 402 is handled by a different processing device. When a similarity measurement for a given pairing of segments is required, the corresponding sub-matrix dot products 408 may be accessed from the various processing devices and summed together, as described above. To further simplify the evaluation of Equation 4, the norms for each vectors, $|a|$ and $|b|$, may be calculated ahead of time and stored for subsequent recall when calculating similarity measurements.

Furthermore, although the examples illustrated above presume that the keyword frequency data 308 for each keyword 306 is used in the determination of the dot products, this is not a requirement. That is, only a portion of the keywords as a whole or within a given sub-matrix may be employed instead. This may be desirable, for example, where certain keywords are not represented in either segment being compared, or where the frequency data for certain keywords, while non-zero, is sufficiently small so as to be dominated by other keywords having much greater frequency values.

Figure 5:
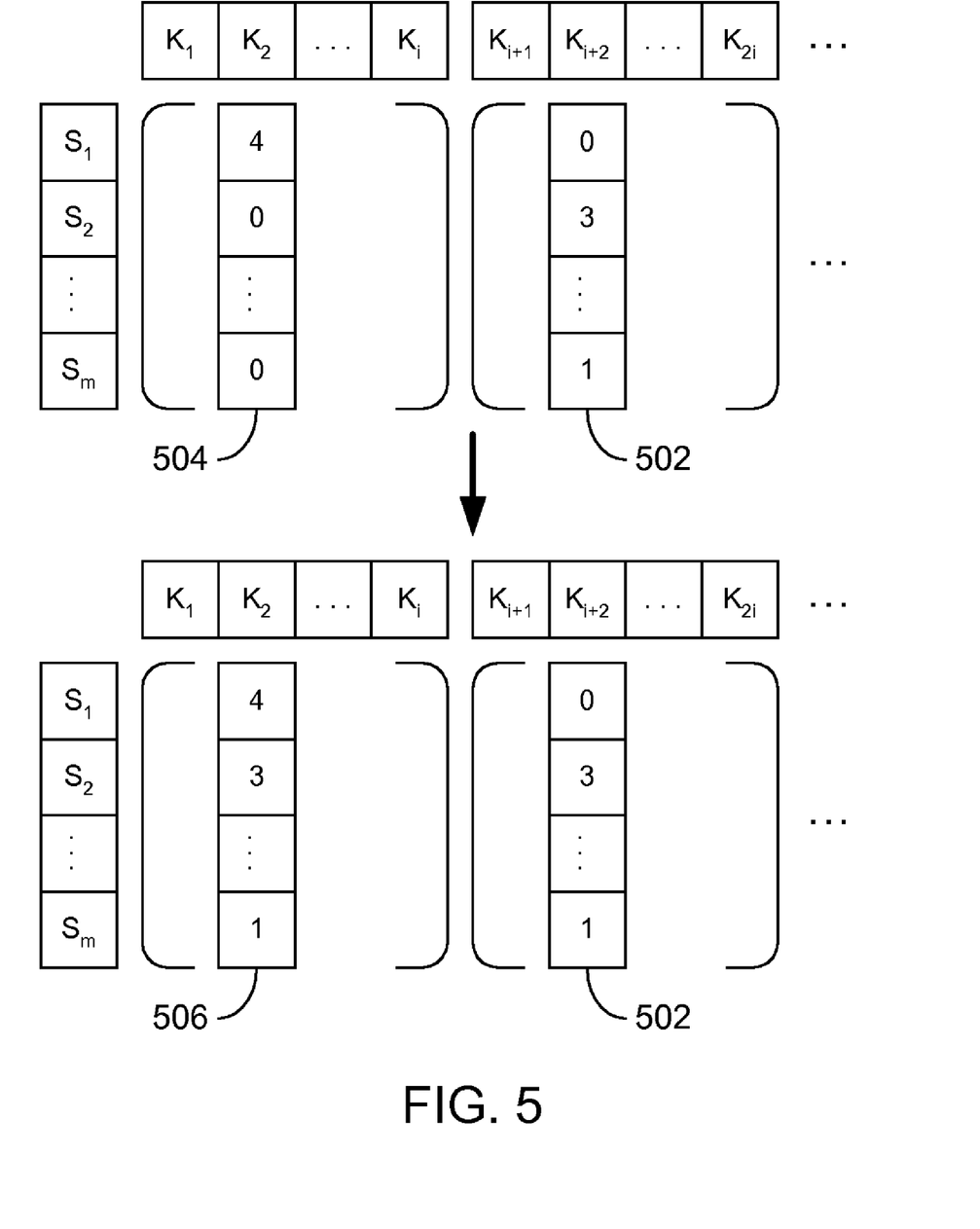
FIG. 5 is an illustration of an embodiment for handling synonymous keywords in accordance with the matrix representation of FIG. 3.

Referring now to FIG. 5, a technique for handling synonyms between keywords is further illustrated. In particular, the illustrated example assumes that keyword $K_2$ and keyword $K_{i+2}$ are synonyms. For example, in the context of a banking or similar industry, words such as "withdrawal" and "debit" may be considered synonyms. Those having ordinary skill in the art will appreciate that a very large number of context-dependent synonym scenarios may be encountered for any given repository. Synonyms can be obtained automatically from sources such as a thesaurus, Wordnet (available at http://wordnet.princeton.edu) or, alternatively, a domain expert can append those with terms specific to the domain. For example, bio-engineering keywords and the corresponding synonym list can be provided by the subject matter expert.

Despite the existence of these synonyms, the first keyword frequency data 502 corresponding to the first keyword, $K_{i+2}$, does not have non-zero entries at these same locations as the second keyword frequency data 504 for the second keyword, $K_2$. Thus, if one were to attempt to calculate the dot product between the segment labeled $S_1$ and the segment labeled $S_2$ (ignoring, for this illustration, the existence of other non-zero valued keywords for each segment), the similarity measurement for keywords $K_2$ and $K_{i+2}$ would erroneously fail to take into account the fact that both segments are related by their synonyms. To account for this possibility, the first keyword frequency data 502 can be combined with the second keyword frequency data 504. For example, in one embodiment, the first keyword frequency data 502 is added to the second keyword frequency data 504 resulting in the modified second keyword frequency data 506, as shown. As a result, the dot product calculation between segment $S_1$ and segment $S_2$ would include a non-zero contribution from these synonymous keywords, thereby providing greater insight into the similarity of these two segments.

Figure 6:
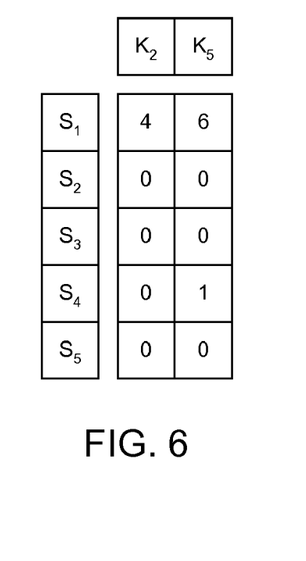
FIG. 6 is an illustration of matrix representation specific to various segments and in which only that portion of the keyword frequency data that contributes to a dot product between two of the segments is shown.

Referring once again to FIG. 3, in order to compute the similarity (as described above) of the first segment, $S_1$, to the other four segments shown, it becomes apparent that only the second and fifth keywords, $K_2$ and $K_5$, would contribute to the dot product of $S_1$ with any other segment's vector. Thus, the matrix representation of FIG. 3 could be simplified as shown in FIG. 6. However, it may be the case that, for example, the RDBMS used to implement the matrix representation 302 does not support the retrieval of non-zero columns, thereby making it difficult to simplify the matrix to the representation illustrated in FIG. 6. Furthermore, even if the representation illustrated in FIG. 6 is readily achievable, the fact that a majority of the keyword frequency data entries are zero values (i.e., the matrix is sparse) implies that a significant number of irrelevant computations would be performed when computing similarity measurements between $S_1$ and the other segments.

Figure 7:
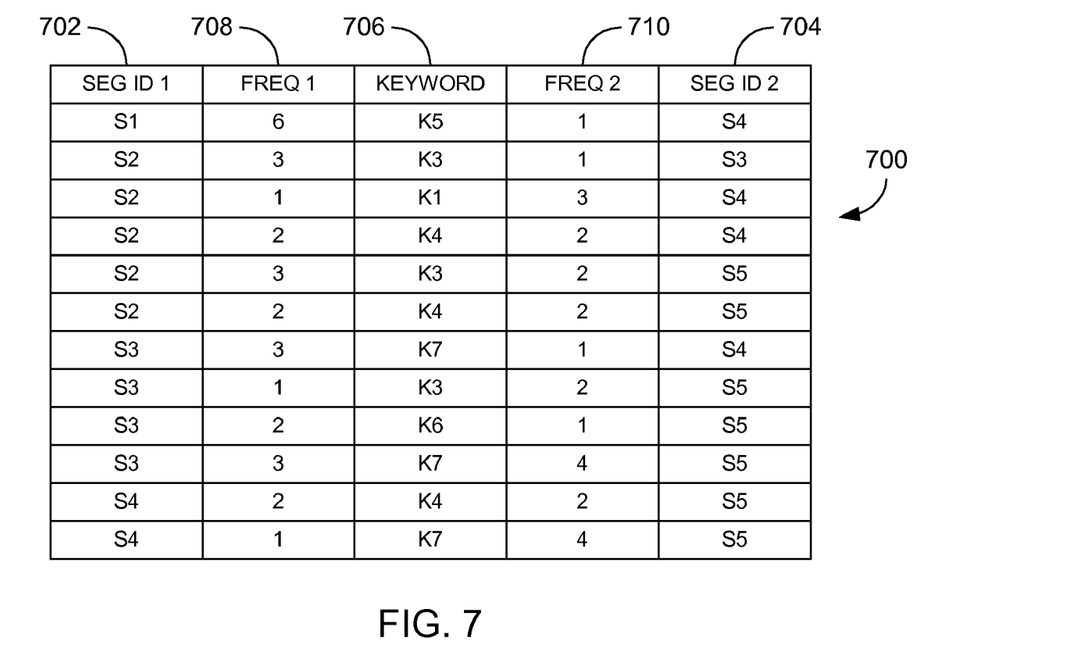
FIG. 7 illustrates yet another embodiment in which keyword frequency data is illustrated in a "view" representation that provides greater computational efficiency relative to the matrix representation of FIG. 3.

Given the possibility of a sparsely populated matrix, so-called views of the matrix data, as further illustrated in FIG. 7, may be employed. As shown in FIG. 7, the matrix representation is reduced to only those non-zero entries that would contribute to a similarity measurement. Thus, the resulting view 700 sets forth a first segment identification 702 and, for each segment thus identified, both a second segment identification 704 and one or more keyword identifications 706 and their respective frequencies 708, 710 that would contribute to a similarity measurement between a first segment and a second segment. Based on the example illustrated in FIG. 3, and as shown in FIG. 7, only keyword $K_5$ contributes to similarity between segments $S_1$ and $S_4$; only keyword $K_3$ contributes to similarity between segments $S_2$ and $S_3$; keywords $K_1$ and $K_4$ contribute to similarity between segments $S_2$ and $S_4$; keywords $K_3$ and $K_4$ contribute to similarity between segments $S_2$ and $S_5$; only keywords $K_7$ contributes to similarity between segments $S_3$ and $S_4$; keywords $K_3$, $K_6$ and $K_7$ contribute to similarity between segments $S_3$ and $S_5$; and keywords $K_4$ and $K_7$ contribute to similarity between segments $S_4$ and $S_5$.

Even with the compressed representation illustrated in FIG. 7, a relatively large repository having a significant number of documents could result in an equally large view representation 700. To make the view representation 700 more manageable, it may be desirable to subdivide the view representation 700. For example, with reference to FIG. 7, those entries corresponding to segments $S_1$ and $S_2$ as the first segment 702 may be stored as one table, whereas those entries corresponding to the remaining first segment entries may be stored as another table.

Figure 8:
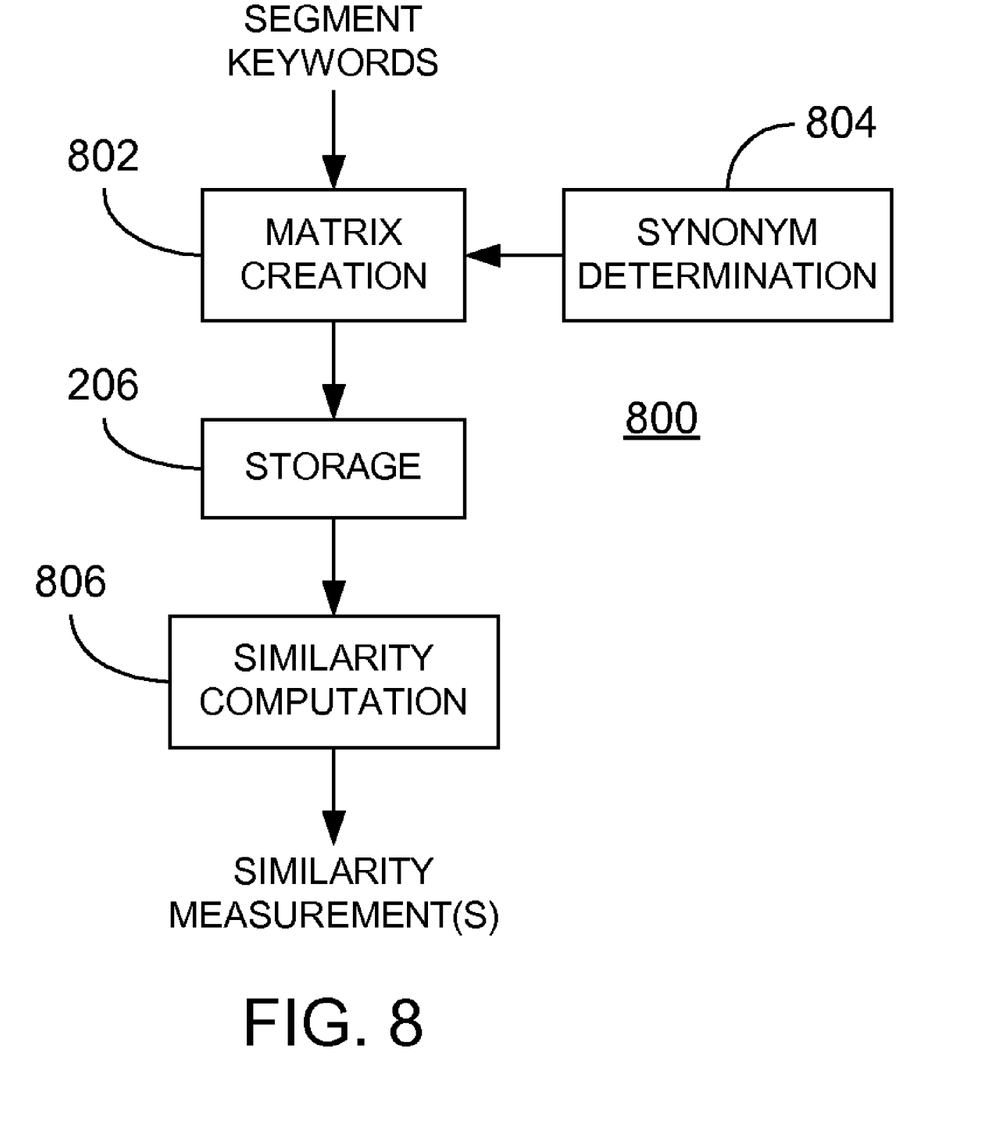
FIG. 8 is a block diagram of an apparatus in accordance with the various embodiments described herein.

Referring now to FIG. 8, an apparatus 800 in accordance with the above-described embodiments is illustrated. The apparatus 800 is preferably implemented using the processing apparatus 202 illustrated in FIG. 2, wherein the illustrated components 802-806 are implemented, at least in part, as stored programs 212 executed by the one or more processors 204. However, as noted above, such components 802-806 may also be implemented partly or entirely using hardware elements.

In particular, the apparatus 800 comprises a matrix creation component 802 that takes as input keywords and their respective frequencies for various segments and, in accordance with the above-described techniques, creates a matrix comprising the keyword frequencies for each segment. As further described above, the matrix creation component 802 may create sub-matrices and/or reduced views based on the keyword frequency data. In creating the matrix (or sub-matrices/views), the matrix creation component 802 may take into account the occurrence of synonyms as identified by a synonym determination component 804 and in accordance with the techniques noted above. To this end, the synonym determination component 804 may utilize a network interface 210 to identify synonyms via a suitable network, such as the World Wide Web and/or Internet, based on services such as Wordnet, described above. The resulting matrix/sub-matrices/views may be stored in the storage device(s) 206 by the matrix creation component. In communication with the storage device(s) 206, a similarity computation component 806 calculates similarity measurements based on the matrix/sub-matrices/reduced views as described above, i.e., via computation of dot products between respective segment vector representations.

As described above, the instant disclosure provides various techniques that may be employed when determining the similarity of document-derived segments, and finds particularly beneficial use when applied to a repository navigation tool. A matrix representation of keyword frequency data for each segment allows the rapid determination of similarity measurements, particularly through the use of sub-matrices that may be processed in a distributed fashion, e.g., a grid computing arrangement. Furthermore, synonyms may be readily accounted for, thereby maximizing the likelihood of detecting otherwise hidden similarities between segments and consequently improving overall system performance. Computational efficiency may be further enhanced through compressed view representations. For at least these reasons, the above-described techniques represent an advancement over prior art teachings.

While particular preferred embodiments have been shown and described, those skilled in the art will appreciate that changes and modifications may be made without departing from the instant teachings. For example, the problem of interlinking documents can be abstracted to that of clustering. Most of clustering algorithms dealing with large data sets adopt approximation algorithms. However, the techniques described herein can be used to compute similarity directly and not as an approximation. Thus, clustering algorithms that typically adopt a similarity or dissimilarity approach can employ the techniques of the instant disclosure to achieve improved precision. Further still, the techniques disclosed herein can be used in more generalized classifiers based on so-called kernel methods, i.e., support vector machines, as a means of determining similarities It is therefore contemplated that any and all modifications, variations or equivalents of the above-described teachings fall within the scope of the basic underlying principles disclosed above and claimed herein.

What is claimed is:

1. In a system for navigating a document repository in which each document in the document repository comprises at least one segment, a method for computing similarity measurements between various ones of a plurality of segments comprising:
    populating a matrix representative of the plurality of segments in which each segment of the plurality of segments is represented by keyword frequency data spanning a plurality of keywords, the matrix comprising a plurality of sub-matrices in which each sub-matrix of the plurality of sub-matrices corresponds to a non-overlapping portion of the plurality keywords;
    identifying a first keyword of the plurality of keywords as being a synonym of a second keyword of the plurality of keywords; and
    adding first keyword frequency data corresponding to the first keyword to second keyword frequency data corresponding to the second keyword to provide modified second keyword frequency data;
    for each sub-matrix of the plurality of sub-matrices, calculating a sub-matrix dot product between a first segment of the plurality of segments and a second segment of the plurality of segments, the sub-matrix dot product spanning at least a portion of the non-overlapping portion of the plurality of keywords, to provide a plurality of sub-matrix dot products, wherein the plurality of sub-matrix dot products comprise dot products of the modified second keyword frequency data and the first keyword frequency data; and
    summing the plurality of sub-matrix dot products to provide a similarity measurement between the first segment and the second segment.

2. The method of claim 1, further comprising:
    identifying an additional segment corresponding to a newly added document in the document repository;
    populating the matrix with additional keyword frequency data spanning the plurality of keywords and corresponding to the additional segment;
    for each sub-matrix of the plurality of sub-matrices, calculating an additional sub-matrix dot product between the additional segment and another segment of the plurality of segments, the additional sub-matrix dot product spanning at least a portion of the non-overlapping portion of the plurality of keywords, to provide a plurality of additional sub-matrix dot products; and
    summing the plurality of additional sub-matrix dot products to provide an additional similarity measurement between the additional segment and the other segment.

3. In a system for navigating a document repository in which each document in the document repository comprises at least one segment, a method for computing similarity measurements between various ones of a plurality of segments comprising:
    populating a matrix representative of the plurality of segments in which each segment of the plurality of segments is represented by keyword frequency data spanning a plurality of keywords;
    identifying a first keyword of the plurality of keywords as being a synonym of a second keyword of the plurality of keywords;
    adding first keyword frequency data corresponding to the first keyword to second keyword frequency data corresponding to the second keyword to provide modified second keyword frequency data; and
    calculating a dot product between a first segment of the plurality of segments and a second segment of the plurality of segments, the dot product spanning at least a portion of the plurality of keywords, including the modified second keyword data, to provide a similarity measurement between the first segment and the second segment, wherein the dot product is a dot product of the modified second keyword data and the first keyword frequency data.

4. The method of claim 3, further comprising:
    identifying an additional segment corresponding to a newly added document in the document repository;
    populating the matrix with additional keyword frequency data spanning the plurality of keywords and corresponding to the additional segment;
    calculating an additional dot product between the additional segment and another segment of the plurality of segments, the additional dot product spanning at least a portion of the plurality of keywords, including the modified second keyword data, to provide an additional similarity measurement between the additional segment and the other segment.

5. An apparatus for computing similarity measurements between various ones of a plurality of segments, comprising:
    a matrix creation component operable to populate a matrix representative of the plurality of segments in which each segment of the plurality of segments is represented by keyword frequency data spanning a plurality of keywords, the matrix comprising a plurality of sub-matrices in which each sub-matrix of the plurality of sub-matrices corresponds to a non-overlapping portion of the plurality keywords;
    at least one storage device, operably coupled to the matrix creation component, operable to store the matrix;
    a similarity computation component operably coupled to the at least one storage component and operable to calculate, for each sub-matrix of the plurality of sub-matrices, a sub-matrix dot product between a first segment of the plurality of segments and a second segment of the plurality of segments, the sub-matrix dot product spanning at least a portion of the non-overlapping portion of the plurality of keywords, to provide a plurality of sub-matrix dot products and sum the plurality of sub-matrix dot products to provide a similarity measurement between the first segment and the second segment; and
    a synonym determination component, operably coupled to the matrix creation component, operable to identify a first keyword of the plurality of keywords as being a synonym of a second keyword of the plurality of keywords and add first keyword frequency data corresponding to the first keyword to second keyword frequency data corresponding to the second keyword to provide modified second keyword frequency data, wherein the plurality of sub-matrix dot products comprise dot products of the modified second keyword data and the first keyword frequency data.

6. An apparatus for computing similarity measurements between various ones of a plurality of segments, comprising:
    a processor;
    a storage device operably coupled to the processor, the storage device comprising executable instructions that when executed by the processor cause the processor to:

populate a matrix representative of the plurality of segments in which each segment of the plurality of segments is represented by keyword frequency data spanning a plurality of keywords, the matrix comprising a plurality of sub-matrices in which each sub-matrix of the plurality of sub-matrices corresponds to a non-overlapping portion of the plurality keywords;

identify a first keyword of the plurality of keywords as being a synonym of a second keyword of the plurality of keywords;

add first keyword frequency data corresponding to the first keyword to second keyword frequency data corresponding to the second keyword to provide modified second keyword frequency data;

for each sub-matrix of the plurality of sub-matrices, calculate a sub-matrix dot product between a first segment of the plurality of segments and a second segment of the plurality of segments, the sub-matrix dot product spanning at least a portion of the non-overlapping portion of the plurality of keywords, to provide a plurality of sub-matrix dot products, wherein the plurality of sub-matrix dot products comprise dot products of the modified second keyword frequency data and the first keyword frequency data; and sum the plurality of sub-matrix dot products to provide a similarity measurement between the first segment and the second segment.

\* \* \* \* \*